United States Patent
Wong et al.

(10) Patent No.: US 10,921,830 B2
(45) Date of Patent: Feb. 16, 2021

(54) STABILITY CONTROLLED SYSTEMS

(71) Applicant: Disney Enterprises, Inc., Burbank, CA (US)

(72) Inventors: Clifford Wong, Burbank, CA (US); Nathan D. Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 111 days.

(21) Appl. No.: 16/392,410

(22) Filed: Apr. 23, 2019

(65) Prior Publication Data
US 2020/0341495 A1 Oct. 29, 2020

(51) Int. Cl.
*G05B 15/02* (2006.01)
*G05D 15/00* (2006.01)

(52) U.S. Cl.
CPC .............. *G05D 15/00* (2013.01); *G05B 15/02* (2013.01)

(58) Field of Classification Search
None
See application file for complete search history.

(56) References Cited

U.S. PATENT DOCUMENTS

| 2011/0069157 A1* | 3/2011 | Ito ............................ H04N 13/32 348/51 |
| 2013/0265213 A1* | 10/2013 | Chen ..................... G09F 15/0087 345/31 |
| 2016/0097638 A1* | 4/2016 | Fedigan .................... G01C 9/06 324/71.1 |
| 2016/0252410 A1* | 9/2016 | Teshigawara ............. G01D 5/12 73/862.046 |

OTHER PUBLICATIONS

Pedley, Mark. "Tilt Sensing Using a Three-Axis Accelerometer." *Freescale Semiconductor Application Note*, 2013. pp. 1-22.

* cited by examiner

*Primary Examiner* — Jason Lin
(74) *Attorney, Agent, or Firm* — Farjami & Farjami LLP

(57) ABSTRACT

A stability controlled system includes a computing platform having a hardware processor, a memory storing a software code, a moveable component, and a tilt sensor. The hardware processor executes the software code to monitor the tilt sensor to determine whether the system is at a tilt with respect to a support surface for the system. When the tilt sensor is sensing the tilt with respect to the support surface: when the moveable component is off, the software code prevents the moveable component from turning on, and when the moveable component is on, the software code performs one of (a) turning off the moveable component, and (b) slowing down a regular rate of motion of the moveable component. When the tilt sensor is not sensing the tilt with respect to the support surface, the software code permits the moveable component to be turned on and have the regular rate of motion.

20 Claims, 6 Drawing Sheets

STABILITY CONTROLLED SYSTEMS

BACKGROUND

An electronics device that is in motion relative to a user of the device can generate pleasing optical effects for the user. For example, a two-dimensional (2D) image rendered on a display screen may appear to a viewer of the display as a three-dimensional (3D) floating image if the display screen is rotated rapidly. However, rapid rotation or other significant movement of an electronics device can result in damage or injury if that movement is not well controlled. In the exemplary use case of the rotating display screen alluded to above, for instance, allowing the display to spin while out of balance may cause a support structure for the display to vibrate or become unstable. At the very least, such instability can negatively affect the visual image being produced. More seriously, however, the unstable display may topple, resulting in damage to the display or injury to the user. Consequently, there is a need in the art for a simple and cost effective solution for preventing damage, to or injury from, a display or other consumer electronics device due to mechanical instability while it is in motion.

SUMMARY

There are provided stability controlled systems and methods for their use, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
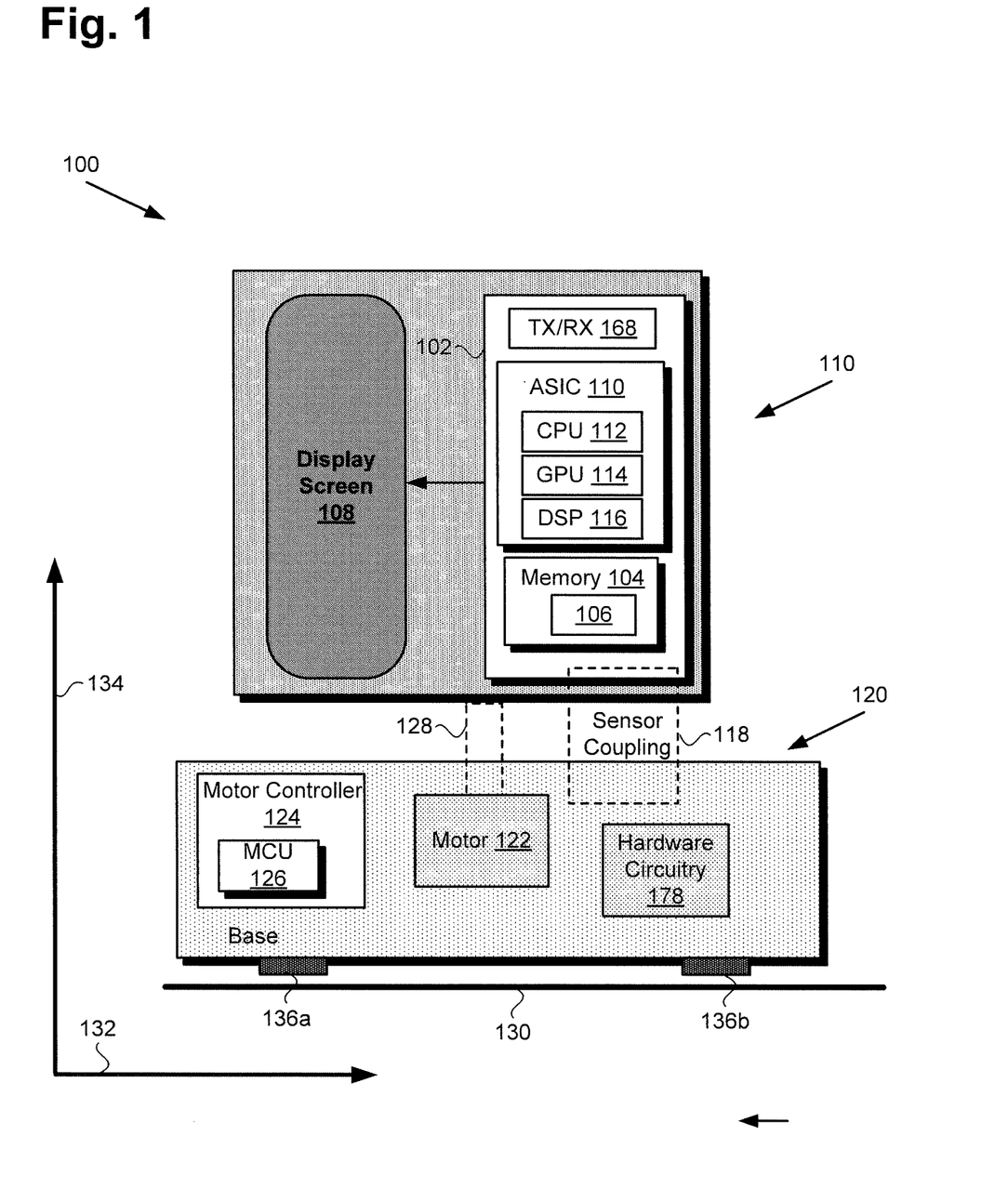
FIG. 1 shows a diagram of an exemplary stability controlled system, according to one set of alternative implementations.

The present application discloses stability controlled systems and methods for use by such systems that overcome the drawbacks and deficiencies in the conventional art. FIG. 1 shows a diagram of an exemplary stability controlled system, according to one set of alternative implementations. As shown in FIG. 1, system 100 includes display 110 configured to rotate, and stationary base 120 coupled to display 110 by rotor 128.

As further shown in FIG. 1, in one implementation, display 110 includes display screen 108 and computing platform 102 communicatively coupled to display screen 108 so as to control display screen 108. Computing platform 102 may include application specific integrated circuit (ASIC) 110 including central processing unit (CPU) 112 implemented as a hardware processor, graphics processing unit (GPU) 114, and may further include digital signal processor (DSP) 116. Computing platform 102 also includes wireless transceiver 168 and system memory 104 implemented as a non-transitory storage device storing software code 106.

System memory 104 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as CPU 112 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, RAM, programmable read-only memory (PROM), erasable PROM (EPROM), and FLASH memory.

Wireless transceiver 168 may be configured to support one or more of WiFi, Bluetooth, Bluetooth Low Energy (BLE), ZigBee, and 60 GHz wireless communications protocols. Moreover, in some implementations, wireless transceiver 168 may also be configured for cellular communications via a fourth generation wireless systems (4G) technology network utilizing a Long-Term Evolution (LTE) standard, for example, or a fifth generation wireless systems (5G) technology network satisfying the IMT-2020 requirements established by the International Telecommunication Union (ITU).

Base 120 includes motor 122 for rotating rotor 128 and display 110, and motor controller circuit 124 including motor control unit (MCU) 126. Base 120 is situated on support surface 130, which may be a floor or any other substantially horizontal surface. In addition, FIG. 1 shows horizontal axis 132 substantially parallel to support surface 130, and vertical axis 134 substantially perpendicular to support surface 130. Also shown in FIG. 1 are tilt sensors 136a and 136b implemented as exemplary pressure sensors disposed between base 120 and support surface 130, as well as sensor coupling 118 bridging base 120 and display 110 so as to communicatively couple tilt sensors 136a and 136b to computing platform 102.

It is noted that although tilt sensors 136a and 136b are represented as pressure sensors in FIG. 1, that characterization is merely exemplary. In other use cases, tilt sensors 136a and/or 136b may implemented as one or more sensors in the form of inertial measurement unit (IMU) sensors, such as accelerometer(s) and gyroscope(s). Moreover, in implementations in which tilt sensor(s) 136a and/or 136b is/are implemented using one or more IMU sensors, those features may be integrated with base 120 or display 110, rather than being disposed between base 120 and support surface 130 as shown in FIG. 1.

It is further noted that although sensors 136a and 136b are characterized as "tilt sensors", their functionality extends beyond merely detecting tilt. For example, when implemented as pressure sensors, tilt sensors 136a and 136b can be used to detect whether system 100 is situated on a stable flat surface, i.e., not over an edge of support surface 130 or on an uneven surface.

For use cases in which tilt sensor(s) 136a and/or 136b is/are implemented as pressure sensors, it is noted that although the implementation shown in FIG. 1 depicts two pressure sensors, that representation is merely exemplary, and in other implementations, system 100 may include a single pressure sensor or more than two pressure sensors. In one implementation, pressure sensing may be implemented using one of tilt sensors 136a or 136b in the form of a pressure sensitive polymer layer, such as a Velostat™ later or a layer of LINQSTAT™ Volume Conductive Film (VCF), for example, configured to be disposed between system 100 and support surface 130.

Alternatively, in some implementations, tilt sensors 136a and 136b may be implemented as respective pressure sensitive polymer feet formed of Velostat™ or LINQSTAT™ VCF, for example, and configured to be disposed between system 100 and support surface 130. For example, where base 120 has a circular footprint on support surface 130, tilt sensors 136a and 136b may correspond to three pressure sensors arranged as vertices of an equilateral triangle beneath base 120. As another example, where base 120 has a square or rectangular footprint on support surface 130, tilt sensors 136a and 136b may correspond to four pressure sensors each situated between a corner of base 120 and support surface 130.

In other implementations, system 100 may omit sensor coupling 118, ASIC 110, and memory 104 storing software code 106. In those implementations, hardware circuitry 178 may be communicatively coupled to tilt sensors 136a and 136b, and may be configured to utilize motor controller 124 directly to control motor 122. In yet other implementations, tilt sensors 136a and 136b may be directly coupled to MCU 126.

Figure 2:
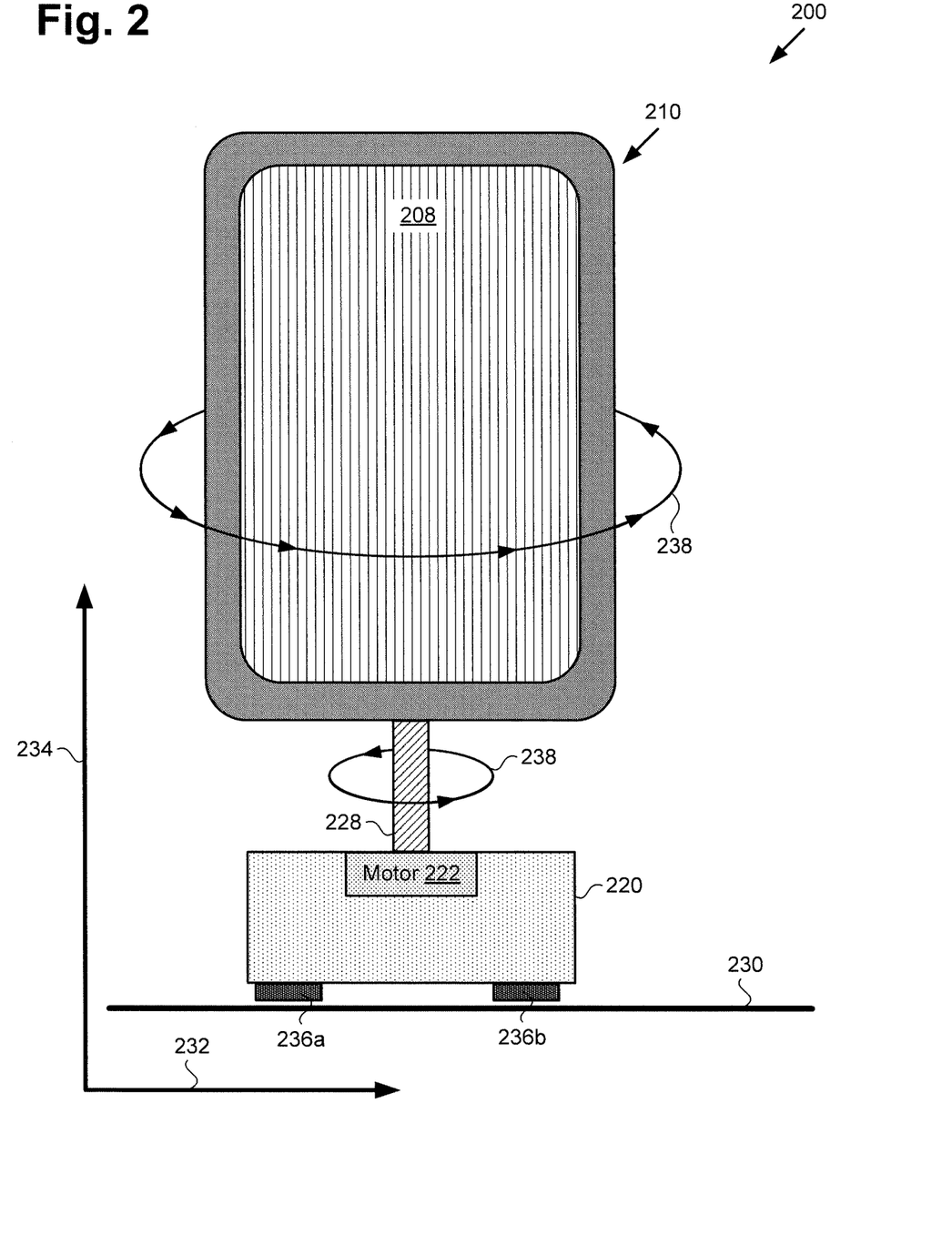
FIG. 2 shows another representation of the exemplary stability controlled system of FIG. 1.

FIG. 2 shows another representation of the exemplary stability controlled system of FIG. 1, according to one implementation. As shown in FIG. 2, system 200 includes base 220 and display 210. Base 220 is shown to include motor 222 and to be situated on support surface 230, which may be a floor or any other substantially horizontal surface. In addition, according to the exemplary implementation shown in FIG. 2, system 200 includes rotor 228 coupling base 220 to display 210.

Display 210 includes display screen 208. Also shown in FIG. 2 are horizontal axis 232 substantially parallel to support surface 230, vertical axis 234 substantially perpendicular to support surface 230, spin direction 238 of rotor 228 and display screen 210, and tilt sensors 236a and 236b disposed between base 220 and support surface 230.

System 200 corresponds in general to system 100, in FIG. 1. As a result, system 200 may share any of the characteristics attributed to system 100 by the present disclosure, and vice versa. In addition, rotor 228, base 220 including motor 222, and tilt sensors 236a and 236b, correspond respectively in general to rotor 128, base 120 including motor 122, and tilt sensors 136a and 136b, in FIG. 1. Thus, rotor 228, base 220, and tilt sensors 236a and 236b may share any of the characteristics attributed respectively to rotor 128, base 120, and tilt sensors 136a and 136b by the present disclosure, and vice versa. That is to say, although not explicitly shown in FIG. 2, base 220 includes features corresponding respectively to motor controller circuit 124 and MCU 126, and, in one implementation, may include optional hardware circuitry 178 communicatively coupled to tilt sensors 136a/236a and 136b/236b. Moreover, like tilt sensors 136a and 136b, tilt sensors 236a and 236b may take the form of one or more pressure sensor(s) and/or IMU sensors.

Display 210 including display screen 208 corresponds in general to display 110 including display screen 108, in FIG. 1. Thus, display 210 may share any of the characteristics attributed to display 110 by the present disclosure, and vice versa. In other words, although not explicitly shown in FIG. 2, in one implementation display 210 includes features corresponding respectively to computing platform 102 having ASIC 110 including CPU 112, GPU 114, and DSP 116, wireless transceiver 168, and system memory 104 storing software code 106. Furthermore, like system 100, system 200 may include sensor coupling 118 bridging base 120/220 and display 110/210.

Referring to FIGS. 1 and 2 in combination, according to one implementation, display screen 108/208 may be controlled by CPU 112 and/or GPU 114 of ASIC 110, while rotor 128/228 coupled to display 110/210 is controlled by CPU 112 of ASIC 110. In that implementation, CPU 112 of ASIC 110 is configured to execute software code 106 to regulate the operation of system 100/200 using CPU 112 and based on sensing or detecting performed by tilt sensors 136a/236a and 136b/236b. In another implementation, hardware circuitry 178 is configured to regulate the motion of display 110/210 of system 100/200 through communication with motor controller 124, based on sensing or detecting performed by tilt sensors 136a/236a and 136b/236b.

CPU 112 may be further configured to execute software code 106 to utilize motor controller 124, or hardware circuitry 178 may utilize motor controller 124 directly, to cause motor 122/222 to spin rotor 128/228 and display 110/210 about vertical axis 134/234 parallel to a display surface of display screen 108/208 at a regular rate of motion to generate an apparently three-dimensional (3D) image corresponding to a two-dimensional (2D) image rendered on display screen 108/208.

As noted above, the functionality of tilt sensors 136a/236a and 136b/236b extends beyond merely detecting tilt. For example, and as also noted above, when implemented as pressure sensors, tilt sensors 136a/236a and 136b/236b can be used to detect whether system 100/200 is situated on a stable flat surface, i.e., not over an edge of support surface 130/230 or on an uneven surface. In use cases like those shown by FIGS. 1 and 2, in which rotor 128/228 is used to spin display 110/210 so as to generate the apparently 3D image, system 100/200 operates optimally and produces the best user experience for an observer to the 3D image when base 120/220 is fully supported and is situated over a flat surface.

In some implementations, display screen 108/208 may be a liquid-crystal display (LCD) screen, for example. Alternatively, in some implementations, display screen 108/208 may be a light-emitting diode (LED) display, an organic light-emitting diode (OLED) display, or any other suitable display screen that performs a physical transformation of signals to light. Moreover, in some implementations, display screen 108/208 may be provided by a mobile communication device included as part of display 110/210, coupled to rotor 128/228, and configured to spin with display screen 108/208 at the regular rate of motion. For example, display screen 108/208 may be part of a smartphone or a tablet computer.

It is noted that CPU 112 may execute software code 106 or hardware circuitry 178 may utilize motor controller 124 directly to control motor 122/222 in order to spin rotor 128/228 and display screen 108/208 about vertical axis 134/234 at a regular rate of motion, i.e., a spin rate that may vary, or may be a substantially constant predetermined spin rate. Moreover, in some implementations, CPU 112 or hardware circuitry 178 may limit the speed of motor 122/222 if a tilt or pressures detected by tilt sensors 136a/236a and 136b/236b is less than optimal for the performance of system 100/200. It is also noted that spin direction 238 may be in either a counter clockwise direction with respect to the plane of horizontal axis 132/232, as shown in FIG. 2, or in a clockwise direction with respect to that plane.

Figure 3:
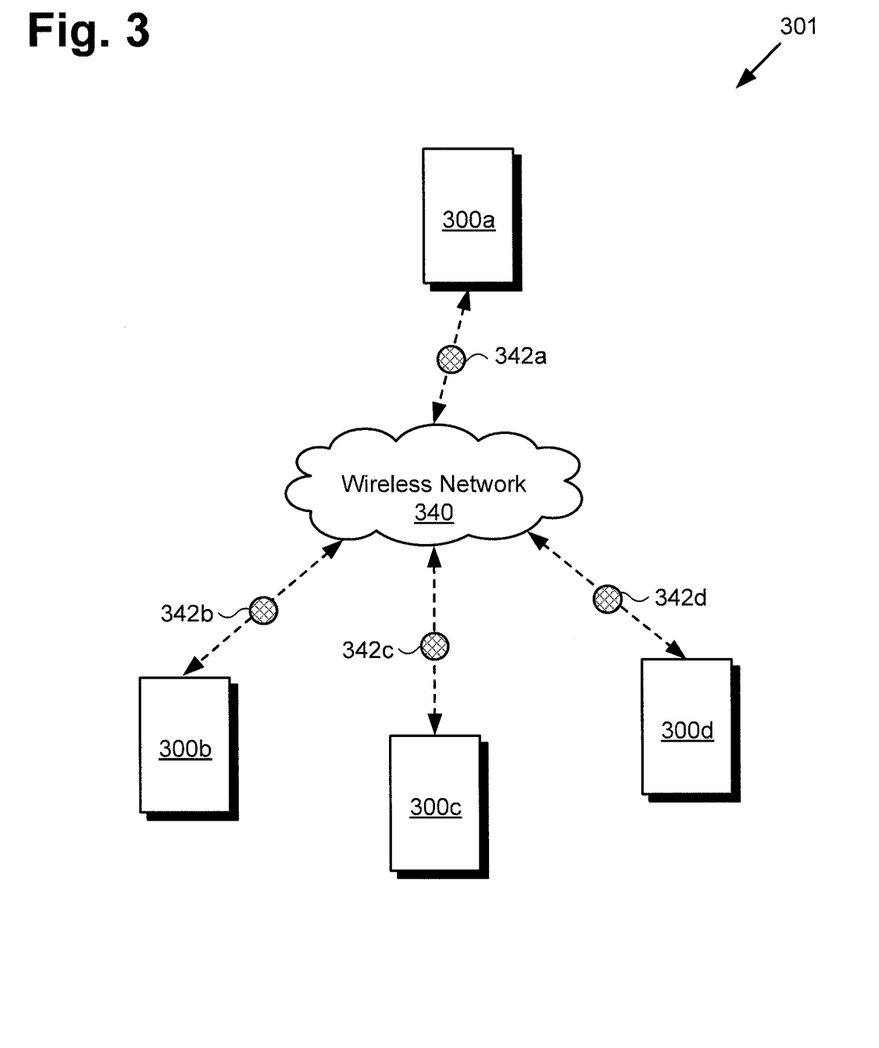
FIG. 3 shows a diagram of a network of communicatively coupled stability controlled systems, according to another implementation.

FIG. 3 shows a diagram of a network of communicatively coupled stability controlled systems, according to another implementation. As shown in FIG. 3, network 301 includes multiple systems 300a, 300b, 300c, and 300d (hereinafter "systems 300a-300d") in wireless communication with one another via wireless network 340. Each of systems 300a-300d corresponds in general to system 100/200 in FIGS. 1 and 2. Consequently, each of systems 300a-300d may share any of the characteristics attributed to system 100/200 by the present disclosure, and vice versa.

Thus, each of systems 300a-300d may include one or more pressure or other tilt sensors corresponding to tilt sensors 136a/236a and/or 136b/236b. In various implementations, tilt sensing may be implemented using a pressure sensitive polymer layer or multiple pressure sensitive polymer feet, such as a Velostat™ or LINQSTAT™ VCF layer or feet, for example. Moreover, in some implementations, hardware circuitry of systems 300a-300d corresponding to hardware circuitry 178 may include additional pressure sensing hardware, such as one or more IMU sensors, such as accelerometer(s) and gyroscope(s).

As shown in FIG. 3, systems 300a-300d may be configured to exchange pressure sensor data using respective wireless transceivers corresponding to wireless transceiver 168, in FIG. 1. That is to say, entertainment system 300a may transmit tilt sensor data 342a received from tilt sensors 136a/236a and/or 136b/236b of entertainment system 300a to systems 300b, 300c, and 300d, entertainment system 300b may transmit tilt sensor data 342b received from tilt sensors 136a/236a and/or 136b/236b of entertainment system 300b to systems 300a, 300c, and 300d, and so forth.

Figure 4A:
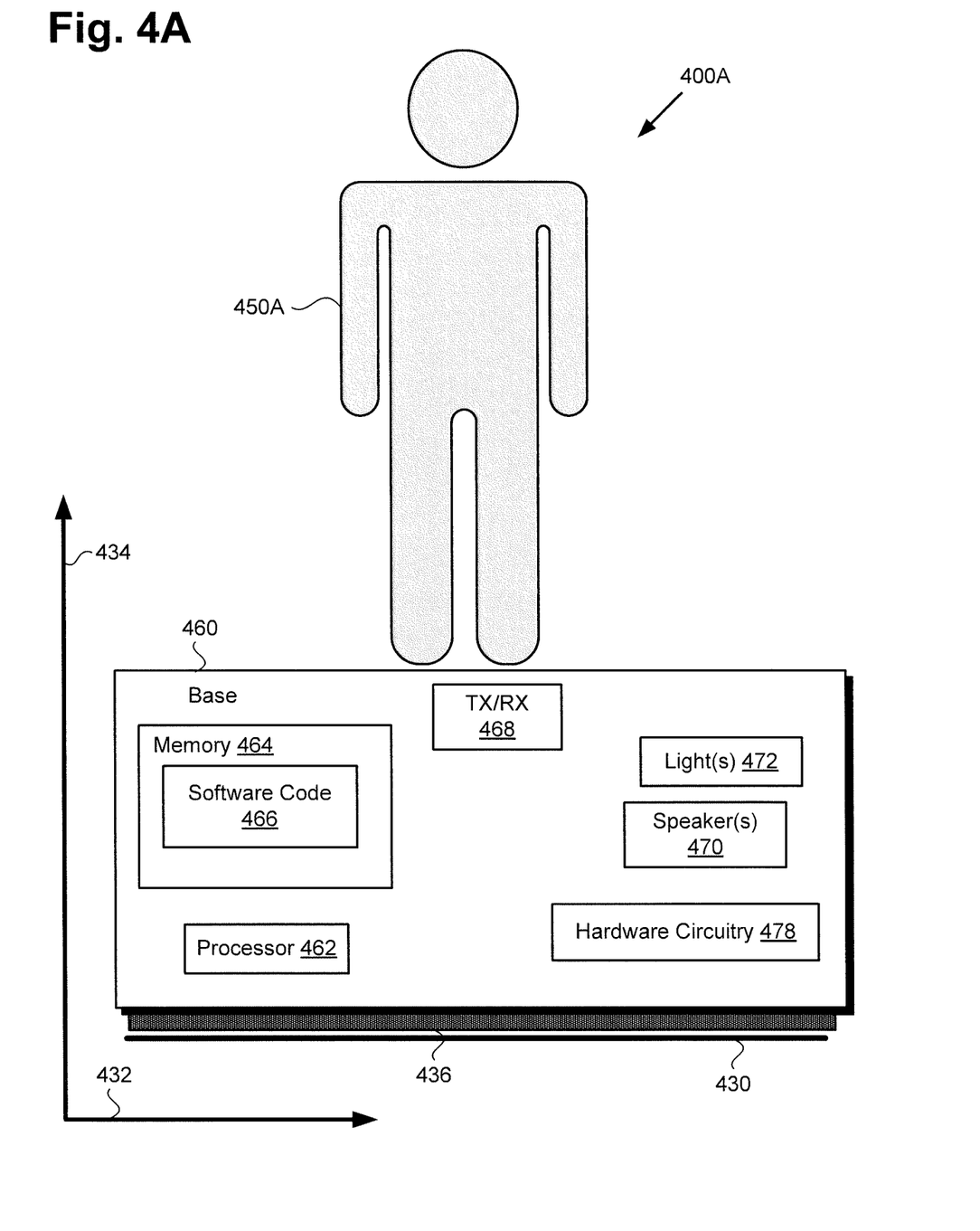
FIG. 4A shows a diagram of an exemplary stability controlled system, according to another set of alternative implementations.

FIG. 4A shows a diagram of an exemplary stability controlled system, according to another set of implementations. According to the exemplary implementation shown in FIG. 4A, system 400A includes figurine 450A of a character, such as a movie, cartoon, television (TV), video game, or theme park character, for example, mounted over, coupled to, or integrated with base 460. Base 460 is situated on support surface 430, which may be a floor or any other substantially horizontal surface. In addition, FIG. 4A shows horizontal axis 432 substantially parallel to support surface 430, and vertical axis 434 substantially perpendicular to support surface 430. Also shown in FIG. 4A is tilt sensor 436 implemented as a pressure sensor disposed between base 460 and support surface 430.

As shown in FIG. 4A, in one implementation, base 460 includes hardware processor 462 and system memory 464 implemented as a non-transitory storage device storing software code 466. It is noted that, like system memory 104 described above, system memory 464 may take the form of any computer-readable non-transitory storage medium. In addition, base 460 may include wireless transceiver 468, and one or more speaker(s) 470 and/or one or more light(s) 472. Thus, base 460 may serve as a computing platform (hereinafter "base/computing platform 460") of entertainment system 400A.

It is noted that although tilt sensor 436 is represented as a pressure sensor in FIG. 4A, that characterization is merely exemplary. In other use cases, tilt sensor 436 may implemented as one or more sensors in the form of IMU sensors, such as accelerometer(s) and gyroscope(s). Moreover, in implementations in which tilt sensor 436 is implemented using one or more IMU sensors, those features may be integrated with base 460 or character figurine 450A, rather than being disposed between base 460 and support surface 430 as shown in FIG. 4A.

Although the implementation shown in FIG. 4A depicts tilt sensor 436 as a pressure sensor in the form of a single pressure sensing layer, that representation is merely exemplary, and in other use cases in which tilt sensor 436 is implemented as a pressure sensor, system 400A may include multiple pressure sensors. In other words, in some implementations, as shown in FIG. 4A, tilt sensing may be implemented using tilt sensor 436 in the form of a pressure sensitive polymer layer, such as a Velostat™ layer or a layer of LINQSTAT™ VCF, for example, configured to be disposed between base/computing platform 460 and support surface 430.

Alternatively, in some implementations, tilt sensor 436 may be implemented as multiple pressure sensitive polymer feet formed of Velostat™ or LINQSTAT™ VCF, for example, and configured to be disposed between system 400A and support surface 430. Thus, character figurine 450A may be situated over tilt sensor 436. In other implementations, system 400A may omit hardware processor 462 and memory 464 storing software code 466. In those implementations, hardware circuitry 478 may be communicatively coupled to tilt sensor 436, and may be configured to control speaker(s) 470 and light(s) 472.

Although base/computing platform 460 is shown as a rectangular box below character figurine 450A of system 400A, in other implementations base/computing platform 460 may take other shapes or ornamental forms and its components may be integrated in any suitable part of system 400A, such as within, behind, on top of, or adjacent to character figurine 450A. Moreover, where base/computing platform 460 has a circular footprint on support surface 430, tilt sensor 436 may correspond to three pressure sensors arranged as vertices of an equilateral triangle beneath base/computing platform 460.

As another example, where base/computing platform 460 has a square or rectangular footprint on support surface 430, tilt sensor 436 may correspond to four pressure sensors each situated between a corner of base/computing platform 460 and support surface 430. It is noted that in implementations in which tilt sensor 436 takes the form of multiple pressure sensors situated between base/computing platform 460 and support surface 430, those pressure sensors can utilized to detect whether system 400A is level, i.e., situated on an even, level surface.

Speaker(s) 470 may include one or more acoustic speakers each having a moveable diaphragm configured to generate sound. Light(s) 472 may include one or more spotlight(s) for highlighting facial features of character figurine 450A, and one or more colored light(s) providing back lighting and/or strobe lighting for system 400A. In some implementations, the spotlight(s) may be implemented using white LEDs configured to move in order to provide directional lighting. Moreover, in some implementations, the colored light(s) may be implemented using moveable or stationary colored LEDs, such as one or more of red, green, and blue LEDs. System 400A may be configured to generate a light show using light(s) 472 and/or an audio presentation. For example, in some implementations, a light show generated using light(s) 472 may be synchronized to audio, such as music and/or song for example, output by speaker(s) 470 of system 400A.

System 400A, in FIG. 4A corresponds in general to any or all of systems 300a-300d in FIG. 3. That is to say, systems 300a-300d may share any of the characteristics attributed to system 400A by the present disclosure, and vice versa. Thus, although not shown in FIG. 3, each of systems 300a-300d may include features corresponding to character figurine 450A, tilt sensor 436, and base/computing platform 460 having hardware processor 462, system memory 464 storing software code 466, speaker(s) 470, light(s) 472, and wireless transceiver 468. Alternatively, each of systems 300a-300d may omit features corresponding to hardware processor 462 and system memory 464 storing software code 466, while including character figurine 450A, tilt sensor 436, and base 460 having hardware circuitry 478, speaker(s) 470, light(s) 472, and wireless transceiver 468.

In implementations in which system 400A includes hardware processor 462, hardware processor 462 may be a microprocessor of system 300a-300d/400A, for example, in which role hardware processor 462 runs the firmware for system 300a-300d/400A and executes software code 466. Wireless transceiver 468 corresponds in general to wireless transceiver 168, in FIG. 1, and may share any of the characteristics attributed to that corresponding feature by the present disclosure. Thus, wireless transceiver 468 may be configured to support one or more of WiFi, Bluetooth, BLE, ZigBee, and 60 GHz wireless communications protocols, and/or 4G LTE and/or 5G cellular communication protocols.

Figure 4B:
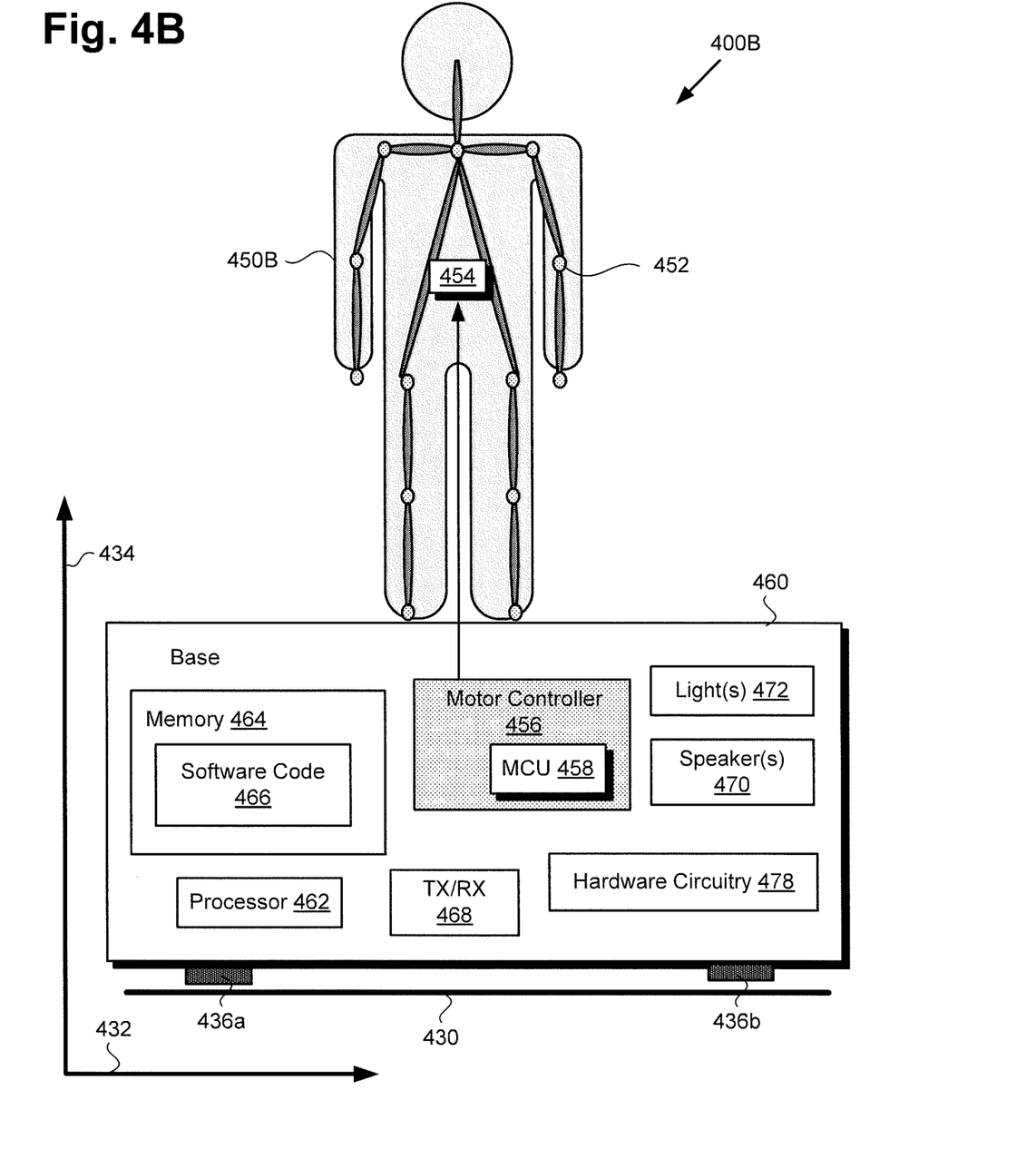
FIG. 4B shows a diagram of an exemplary stability controlled system, according to yet another set of alternative implementations.

FIG. 4B shows a diagram of exemplary system 400B, according to yet another set of implementations. According to the exemplary implementation shown in FIG. 4B, system 400B includes figurine 450B of a character, such as a movie, cartoon, TV, video game, or theme park character, for example, mounted over base/computing platform 460. It is noted that features in FIG. 4B identified by reference numbers identical to those shown in FIG. 4A correspond respectively to those previously described features, and may share any of the characteristics attributed to those corresponding features, above.

System 400B includes tilt sensors 436a and 436b in the form of pressure sensitive polymer feet, such as a Velostat™ or LINQSTAT™ VCF layer or feet, for example, disposed between base/computing platform 460 of system 400B and support surface 430. As shown in FIG. 4B, character figurine 450B may be situated over tilt sensors 436a and 436b.

As shown in FIG. 4B, in addition to the features shown in FIG. 4A, base/computing platform 460 of system 400B further includes motor controller circuitry 456 having MCU 458. Moreover, according to the implementation shown in FIG. 4B, figurine 450B of system 400B may include one or more articulable joint(s) 452 configured to enable movement of the head and/or limbs of figurine 450B under the control of motor 454, motor controller circuitry 456, and either software code 466 or hardware circuitry 478. That is to say, in some implementations hardware processor 462 may execute software code 466 to control motor 454 to articulate one or more articulable joint(s) 452 of character figurine 450B, while in other implementations hardware circuitry may control motor 454 to articulate one or more articulable joint(s) 452 of character figurine 450B.

Like system 400A, system 400B may correspond in general to any or all of systems 300a-300d in FIG. 3. That is to say, systems 300a-300d may share any of the characteristics attributed to system 400B by the present disclosure, and vice versa. Thus, although not shown in FIG. 3, each of systems 300a-300d may include features corresponding to character figurine 450B including motor 454 and articulable joint(s) 452, and base/computing platform 460 having motor controller circuitry 456 including MCU 458.

Figure 5:
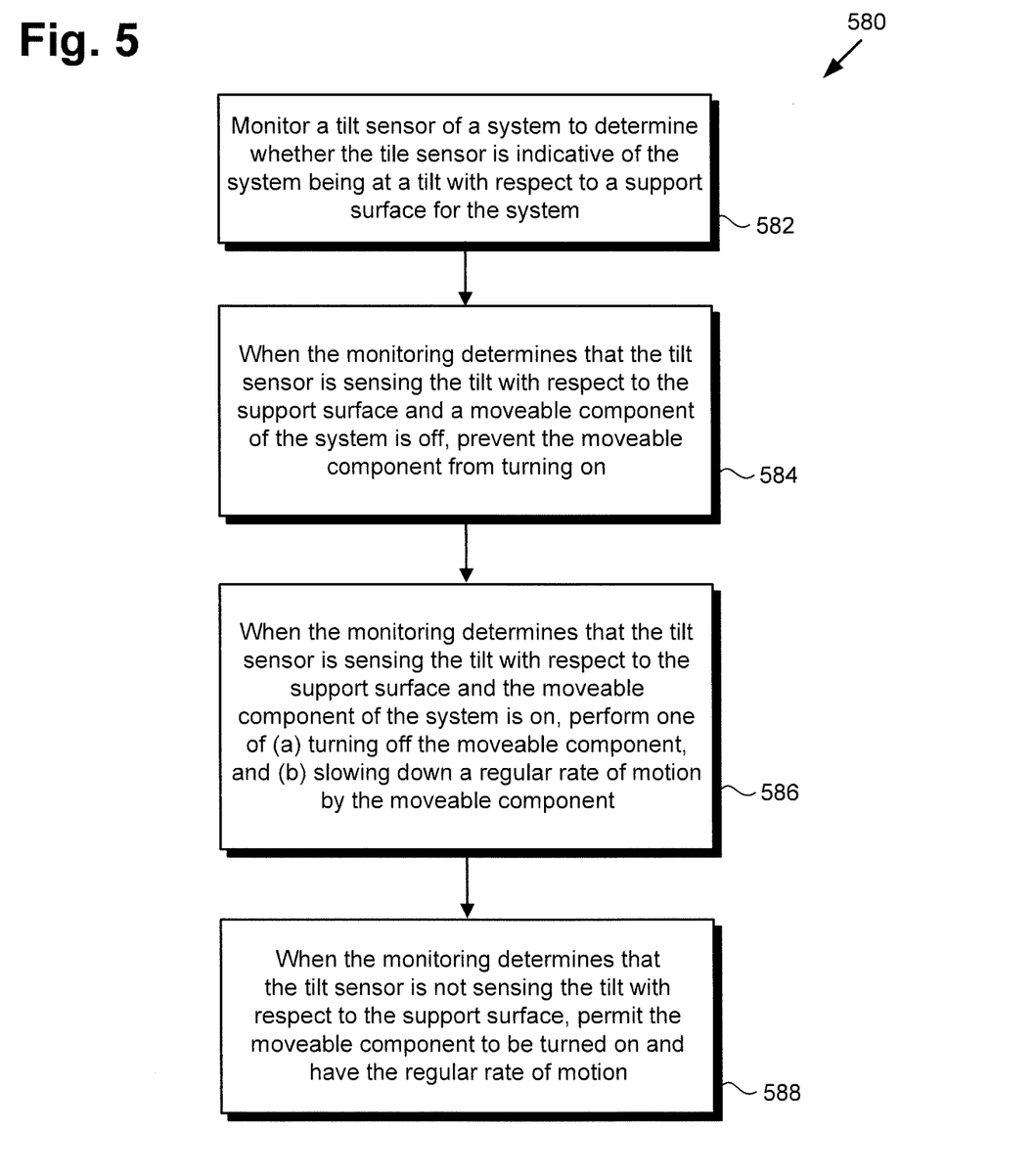
FIG. 5 shows a flowchart outlining an exemplary method for use by a stability controlled system, according to one implementation.

The functionality of systems 100/200/300a-300d/400A/400B will be further described by reference to FIG. 5 in combination with FIGS. 1, 2, 3, 4A, and 4B. FIG. 5 shows flowchart 580 presenting an exemplary method for use by a stability controlled system. With respect to the method outlined in FIG. 5, it is noted that certain details and features have been left out of flowchart 580 in order not to obscure the discussion of the inventive features in the present application.

Flowchart 580 begins with monitoring one or more tilt sensor(s) 136a/136b/236a/236b/436/436a/436b to determine whether the one or more tilt sensor(s) 136a/136b/236a/236b/436/436a/436b is/are indicative of system 100/200/300a-300d/400A/400B being at a tilt with respect to support surface 130/230/430 for system 100/200/300a-300d/400A/400B (action 582). In use cases in which tilt sensor(s) 136a/136b/236a/236b/436/436a/436b are implemented as pressure sensor(s), a pressure indicative of system 100/200/300a-300d/400A/400B being at a tilt with respect to support surface 130/230/430 may correspond to different pressures being sensed by two or more of tilt sensors 136a/136b/236a/236b/436a/436b implemented as pressure sensitive feet, or a pressure differential being sensed over the surface of tilt sensor 436 implemented as a single pressure sensitive layer or film.

Thus, a change in pressure sensed by any of tilt sensors 136a/136b/236a/236b/436a/436b, or sensed over the surface of tilt sensor 436 may indicate that system 100/200/300a-300d/400A/400B is at a tilt with respect to support surface 130/230/430, or is no longer in contact with support surface 130/230/430, due to being off balance, or otherwise mechanically unstable. Alternatively, reduction in the pressure sensed by all of tilt sensors 136a/136b/236a/236b/436a/436b, or sensed across substantially the entire surface of tilt sensor 436 may indicate that system 100/200/300a-300d/400A/400B has been lifted off of support surface 130/230/430 by a user, or has toppled from support surface 130/230/430.

According to some of the implementations shown by FIGS. 1 and 2, action 582 may be performed by software code 106, executed by CPU 112 of computing platform 102, and using one or more of tilt sensors 136a/236a and 136b/236b, hardware circuitry 178, and sensor coupling 118. However, in other implementations corresponding to FIGS. 1 and 2, action 582 may be performed by hardware circuitry 178 using one or more of tilt sensors 136a/236a and 136b/236b.

According to some of the implementations shown by FIGS. 4A and 4B, action 582 may be performed by software code 466, executed by hardware processor 462 of base/computing platform 460, and using one or more of tilt sensors 436, 436a, and 436b, and hardware circuitry 478. However, in other implementations corresponding to FIGS. 4A and 4B, action 582 may be performed by hardware circuitry 478 using one or more of tilt sensors 436, 436a, and 436b.

Flowchart 580 continues with, when action 582 determines that one or more tilt sensor(s) 136*a*/136*b*/236*a*/236*b*/436/436*a*/436*b* is/are sensing a tilt with respect to support surface 130/230/430, and when a moveable component of system 100/200/300*a*-300*d*/400A/400B is off, prevent the moveable component of system 100/200/300*a*-300*d*/400A/400B from turning on (action 584). According to the exemplary implementations shown in FIGS. 1 and 2, a moveable component of system 100/200/300*a*-300*d* may include display 110/210 coupled to base 120/220 by rotor 128/228. According to the exemplary implementations shown in FIGS. 4A and 4B, a moveable component of entertainment system 300*a*-300*d*/400A/400B may include one or more of a component of speaker(s) 470, light(s) 472, and character figurine 450B having articulable joints 452.

Thus, according to the implementations shown in FIGS. 1 and 2, action 584 corresponds to preventing stationary display 110/210 and static rotor 128/228 from beginning to spin. According to some of those implementations, action 584 may be performed by software code 106, executed by CPU 112 of computing platform 102, and using motor controller 124 to control motor 122/222. However, in other such implementations, hardware circuitry 178 may detect when one or more tilt sensor(s) 136*a*/136*b*/236*a*/236*b* is/are sensing a tilt with respect to support surface 130/230, and may prevent stationary display 110/210 and static rotor 128/228 from beginning to spin by using motor controller 124 to control motor 122/222.

In the exemplary implementations shown in FIGS. 4A and 4B, action 584 may correspond to preventing speaker(s) 470 from producing sound, preventing light(s) 472 from moving or emitting light, and/or preventing articulation of any of articulable joints 452 of character figurine 450B. According to some of those implementations, action 584 may be performed by software code 466, executed by hardware processor 462 of base/computing platform 460. However, in other implementations corresponding to FIGS. 4A and 4B, hardware circuitry 478 may detect when one or more tilt sensor(s) 436/436*a*/436*b* is/are not sensing the pressure indicative of entertainment system 300*a*-300*d*/400A/400B being in contact with support surface 430, and may prevent the moveable component of entertainment system 300*a*-300*d*/400A/400B from turning on.

Flowchart 580 continues with, when action 582 determines that one or more of tilt sensor(s) 136*a*/136*b*/236*a*/236*b*/436/436*a*/436*b* is/are sensing the tilt with respect to support surface 130/230/430, and when a moveable component of system 100/200/300*a*-300*d*/400A/400B is on, perform one of (a) turning off the moveable component of system 100/200/300*a*-300*d*/400A/400B, and (b) slowing down a regular rate of motion of the moveable component of system 100/200/300*a*-300*d*/400A/400B (action 586). As noted above, according to the implementations shown in FIGS. 1 and 2, the moveable component of system 100/200/300*a*-300*d* may include display 110/210 coupled to base 120/220 by rotor 128/228, while according to the implementations shown in FIGS. 4A and 4B, the moveable component of system 300*a*-300*d*/400A/400B may include one or more of a component of speaker(s) 470, light(s) 472, and character figurine 450B having articulable joints 452.

Thus, according to the implementations shown in FIGS. 1 and 2, action 586 corresponds to causing spinning display 110/210 and rotor 128/228 to (a) stop spinning, or (b) to slow their spin rate. According to some of those implementations, action 586 may be performed by software code 106, executed by CPU 112 of computing platform 102, and using motor controller 124 to control motor 122/222. However, in other implementations, hardware circuitry 178 may detect when one or more tilt sensor(s) 136*a*/136*b*/236*a*/236*b* is/are sensing the tilt with respect to support surface 130/230, and may use motor controller 124 to control motor 122/222.

As a specific example of action 586 in the context of the implementations shown in FIGS. 1 and 2, CPU 112 of computing platform 102 may execute software code 106 to utilize tilt sensors 136*a*/236*a* and 136*b*/236*b* to sense when an axis of rotation of rotor 128/228 and display 110/210 is at a tilt with respect to an axis perpendicular to support surface 130/230, i.e., is at a tilt with an axis substantially parallel to vertical axis 134/234. CPU 112 may then further execute software code 106 to control motor 122/222 to stop spinning rotor 128/228 and display 110/210 when the tilt exceeds a predetermined angle relative to the axis perpendicular to support surface 130/230.

As another example of action 586 in the context of the implementations shown in FIGS. 1 and 2, hardware circuitry 178 communicatively coupled to tilt sensors 136*a*/236*a* and 136*b*/236*b* may detect when an axis of rotation of rotor 128/228 and display 110/210 is at a tilt with respect to an axis perpendicular to support surface 130/230. Hardware circuitry 178 may then utilize motor controller 124 to control motor 122/222 to stop spinning rotor 128/228 and display 110/210 when the tilt exceeds a predetermined angle relative to the axis perpendicular to support surface 130/230.

According to the exemplary implementations shown in FIGS. 4A and 4B, action 586 may correspond to (a) preventing speaker(s) 470 from producing sound, preventing light(s) 472 from moving or emitting light, and/or preventing articulation of any of articulable joints 452 of character figurine 450B. Alternatively, or in addition, action 586 may correspond to (b) reducing the sound produced by speaker(s) 470, slowing any movement by light(s) 472, and/or slowing the rate at which any of articulable joints 452 of character figurine 450B are being articulated. According to some of those implementations, action 586 may be performed by software code 466, executed by hardware processor 462 of base/computing platform 460. However, in other implementations corresponding to FIGS. 4A and 4B, hardware circuitry 478 may detect when one or more tilt sensor(s) 436/436*a*/436*b* is/are sensing the tilt with respect to support surface 430, and may perform action 586.

Flowchart 580 can conclude with, when action 582 determines that one or more of tilt sensor(s) 136*a*/136*b*/236*a*/236*b*/436/436*a*/436*b* is/are not sensing a tilt with respect to support surface 130/230/430, permit the moveable component of system 100/200/300*a*-300*d*/400A/400B to be turned on and have the regular rate of motion (action 588).

Thus, according to the implementations shown in FIGS. 1 and 2, action 588 results in permitting display 110/210 and rotor 128/228 to spin at a predetermined spin rate for generating an apparently 3D image corresponding to a 2D image rendered on display screen 108/208. According to some of those implementations, action 588 may be performed by software code 106, executed by CPU 112 of computing platform 102, and using motor controller 124 to control motor 122/222. However, in other implementations corresponding to FIGS. 1 and 2, hardware circuitry 178 may detect when one or more tilt sensor(s) 136*a*/236*a* and 136*b*/236*b* is/are not sensing a tilt with respect to support surface 130/230, and may perform action 588.

According to the exemplary implementations shown in FIGS. 4A and 4B, action 588 may correspond to permitting speaker(s) to produce sound, permitting light(s) 472 to move ant emit light, and/or permitting articulation of any of articulable joints 452 of character figurine 450B. According to some of those implementations, action 588 may be performed by software code 466, executed by hardware processor 462 of base/computing platform 460. However, in other implementations corresponding to FIGS. 4A and 4B, hardware circuitry 478 may detect when one or more tilt sensor(s) 436/436a/436b is/are not sensing a tilt with respect to support surface 430, and may perform action 588.

Although not included in the outline provided by flowchart 580, in some implementations, the present method may further include transmitting tilt sensor data 342a/342b/342c/342d received from one or more of tilt sensor(s) 136a/136b/236a/236b/436/436a/436b to another system. For example, and as discussed above by reference to FIG. 3, system 300a may transmit tilt sensor data 342a received from one or more of tilt sensor(s) 136a/136b/236a/236b/436/436a/436b of system 300a to systems 300b, 300c, and 300d, system 300b may transmit tilt sensor data 342b received from one or more of tilt sensor(s) 136a/136b/236a/236b/436/436a/436b of system 300b to systems 300a, 300c, and 300d, and so forth.

It is noted that transmission of tilt sensor data 342a/342b/342c/342d may occur in conjunction with any or all actions described by flowchart 580. In other words, transmission of tilt sensor data 342a/342b/342c/342d may occur as a result of any or all of actions 582, 584, 586, and 588. In some of the implementations shown in FIGS. 1 and 2, for example, transmission of tilt sensor data 342a/342b/342c/342d may be performed by software code 106, executed by CPU 112 of computing platform 102, and using wireless transceiver 168. However, in other implementations corresponding to FIGS. 1 and 2, transmission of tilt sensor data 342a/342b/342c/342d may be performed by hardware circuitry 178 using wireless transceiver 168.

According to the exemplary implementations shown in FIGS. 4A and 4B, transmission of tilt sensor data 342a/342b/342c/342d may be performed by software code 466, executed by hardware processor 462 of base/computing platform 460, and using wireless transceiver 468. However, in other such implementations, transmission of tilt sensor data 342a/342b/342c/342d may be performed by hardware circuitry 478 using wireless transceiver 468.

Thus, the present application discloses stability controlled systems and methods for use by such systems. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a hardware processor and a system memory storing a software code;
   a moveable component;
   a tilt sensor communicatively coupled to the computing platform;
   to the hardware processor configured to execute the software code to:
   monitor the tilt sensor to determine whether the tilt sensor is indicative of the system being at a tilt with respect to a support surface for the system;
   when monitoring determines that the tilt sensor is sensing the tilt with respect to the support surface:
   when the moveable component of the system is off, prevent the moveable component of the system from turning on; and
   when the moveable component of the system is on, perform one of (a) turning off the moveable component of the system, or (b) slowing down a regular rate of motion of the moveable component of the system;
   when monitoring determines that the tilt sensor is not sensing the tilt with respect to the support surface, permit the moveable component of the system to be turned on and have the regular rate of motion.

2. The system of claim 1, wherein the tilt sensor comprises at least one pressure sensor, wherein the at least one pressure sensor indicates whether or not at least a portion of the system is in contact with the support surface.

3. The system of claim 2, further comprising a base situated over the at least one pressure sensor, wherein the at least one pressure sensor comprises a pressure sensitive polymer layer configured to be disposed between the base and the support surface.

4. The system of claim 2, wherein the at least one pressure sensor comprises a plurality of pressure sensitive polymer feet configured to be disposed between the entertainment system and the support surface.

5. The system of claim 1, further comprising a motor and a base, wherein the moveable component comprises a display coupled to the base by a rotor, the motor being configured to spin the rotor and the display under the control of the software code.

6. The system of claim 1, further comprising a motor and a base, wherein the moveable component comprises a display coupled to the base by a rotor, the motor being configured to spin the rotor and the display under the control of the software code, wherein the hardware processor is further configured to execute the software code to:
   sense when an axis of rotation of the rotor and the display is at the tilt with respect to an axis perpendicular to the support surface; and
   control the motor to stop spinning the rotor and the display when the tilt exceeds a predetermined angle relative to the axis perpendicular to the support surface.

7. The system of claim 6, wherein the tilt sensor comprises an inertial measurement unit (IMU).

8. The system of claim 1, further comprising a figurine of a character situated over the tilt sensor, wherein the figurine has at least one articulable joint, the system further comprising a motor configured to articulate the at least one articulable joint of the figurine under the control of the software code.

9. A method for use by a system including a computing platform having a hardware processor, a system memory storing a software code, a moveable component, and a tilt sensor communicatively coupled to the computing platform, the method comprising:
   monitoring, by the software code executed by the hardware processor, the tilt sensor to determine whether the tilt sensor is indicative of the system being at a tilt with respect to a support surface for the system;
   when monitoring determines that the tilt sensor is sensing the tilt with respect to the support surface:

when the moveable component of the system is off, preventing, by the software code executed by the hardware processor, the moveable component of the system from turning on; and when the moveable component of the system is on, performing one of (a) turning off the moveable component of the system, or (b) slowing down a regular rate of motion of the moveable component of the system by the software code executed by the hardware processor;

when monitoring determines that the tilt sensor is not sensing the tilt with respect to the support surface, permitting, by the software code executed by the hardware processor, the moveable component of the system to be turned on and have the regular rate of motion.

10. The method of claim 9, wherein the tilt sensor comprises at least one pressure sensor, wherein the at least one pressure sensor indicates whether or not at least a portion of the system is in contact with the support surface.

11. The method of claim 10, wherein the system further comprises a base situated over the at least one pressure sensor, wherein the at least one pressure sensor comprises a pressure sensitive polymer layer configured to be disposed between the base and the support surface.

12. The method of claim 10, wherein the at least one pressure sensor comprises a plurality of pressure sensitive polymer feet configured to be disposed between the entertainment system and the support surface.

13. The method of claim 9, wherein the system further comprises a motor and a base, wherein the moveable component comprises a display coupled to the base by a rotor, the motor being configured to spin the rotor and the display under the control of the software code.

14. The method of claim 9, wherein the system further comprises a motor and a base, wherein the moveable component comprises a display coupled to the base by a rotor, the motor being configured to spin the rotor and the display under the control of the software code, the method further comprising:

sensing, by the software code executed by the hardware processor, when an axis of rotation of the rotor and the display is at the tilt with respect to an axis perpendicular to the support surface; and controlling the motor, by the software code executed by the hardware processor, to stop spinning the rotor and the display when the tilt exceeds a predetermined angle relative to the axis perpendicular to the support surface.

15. The method of claim 9, further comprises a figurine of a character situated over the tilt sensor, wherein the figurine has at least one articulable joint, the system further comprising a motor configured to articulate the at least one articulable joint of the figurine under the control of the software code.

16. The method of claim 9, wherein the system further comprises a transceiver configured for wireless communication with another system, wherein the method further comprises transmitting, by the software code executed by the hardware processor, sensor data received from the tilt sensor to the another entertainment system.

17. An entertainment system comprising:

a hardware circuitry;

at least one pressure sensor communicatively coupled to the hardware circuitry;

when the hardware circuitry detects that the at least one pressure sensor is not sensing a pressure indicative of the entertainment system being in contact with the support surface:

when a moveable component of the entertainment system is off, the hardware circuitry prevents the moveable component of the entertainment system from turning on; and when the moveable component of the entertainment system is on, the hardware circuitry performs one of (a) turning off the moveable component of the entertainment system, or (b) slowing down a regular rate of motion of the moveable component of the entertainment system;

when the hardware circuitry detects that the at least one pressure sensor is sensing the pressure indicative of the entertainment system being in contact with the support surface, the hardware circuitry permits the moveable component of the entertainment system to be turned on and have the regular rate of motion.

18. The entertainment system of claim 17, wherein the at least one pressure sensor comprises one of a pressure sensitive polymer layer and a plurality of pressure sensitive polymer feet configured to be disposed between the base and the support surface.

19. The entertainment system of claim 17, further comprising a motor, and a base situated over the at least one pressure sensor, wherein the moveable component comprises a display coupled to the base by a rotor, the motor being configured to spin the rotor and the display under the control of the hardware circuitry.

20. The entertainment system of claim 17, wherein the entertainment system further comprises a figurine of a character situated over the at least one pressure sensor.

* * * * *